United States Patent [19]

DeLong et al.

[11] Patent Number: 4,732,583
[45] Date of Patent: Mar. 22, 1988

[54] GAS SEPARATION

[75] Inventors: Bradley W. DeLong, Bartlesville, Okla.; Jeffrey R. Burkinshaw, Casper, Wyo.

[73] Assignee: Phillips Petroleum Company, Bartlesville, Okla.

[21] Appl. No.: 677,668

[22] Filed: Dec. 3, 1984

[51] Int. Cl.⁴ .......................................... B01D 53/24
[52] U.S. Cl. .......................................... 55/16; 55/68; 55/158; 55/267; 62/24
[58] Field of Search ................ 55/16, 68, 158; 62/23, 62/24

[56] References Cited

U.S. PATENT DOCUMENTS

| | | | |
|---|---|---|---|
| 2,540,152 | 2/1951 | Weller | 55/16 |
| 3,250,080 | 5/1966 | Garwin | 62/24 |
| 3,251,652 | 5/1966 | Pfefferle | 55/16 X |
| 3,324,626 | 6/1967 | Dresser et al. | 55/16 |
| 3,336,730 | 8/1967 | McBride et al. | 55/16 |
| 3,449,168 | 6/1969 | Sederquist | 136/86 |
| 3,450,500 | 6/1969 | Setzer et al. | 23/212 |
| 3,565,784 | 2/1971 | Schlinger et al. | 208/11 |
| 3,595,805 | 7/1971 | Cohn et al. | 55/16 X |
| 3,596,472 | 8/1971 | Streich | 62/28 |
| 4,003,821 | 1/1977 | Weil et al. | 208/11 R |
| 4,012,212 | 3/1977 | Kniel | 62/28 |
| 4,229,188 | 10/1980 | Intille | 55/16 |
| 4,238,204 | 12/1980 | Perry | 55/158 X |
| 4,264,338 | 4/1981 | Null | 55/158 X |
| 4,466,946 | 8/1984 | Goddin, Jr. et al. | 62/24 X |

FOREIGN PATENT DOCUMENTS 100923  2/1984  European Pat. Off. ............... 55/16

Primary Examiner—Robert Spitzer
Attorney, Agent, or Firm—John R. Casperson

[57] ABSTRACT

By incorporating a gas permeable membrane into a hydrogen purification process at the front end of the cryogenic unit, the low purity hydrogen can be made into a high purity stream and a low purity stream. The critical pressure of the low purity stream is such that the low purity stream can be purified cryogenically without depressurization.

12 Claims, 1 Drawing Figure

GAS SEPARATION

BACKGROUND OF THE INVENTION

This invention relates to separating the components of a gas stream. In one aspect, a high purity hydrogen stream is separated from a gas stream containing higher boiling components. In another aspect, the invention relates to an apparatus for separating the components of a gas stream.

Hydrogen containing streams are frequently encountered in plants in which feed stocks or other process streams are being hydrotreated or hydrogenated. Examples include hydroretorting of oil shale, hydrotreating heavy oils, hydroisomerization of hydrocarbons and hydrogenation of olefinic stocks. The hydrogen feed for such plants may be a byproduct stream such as from cat cracking gas oils or dehydrogenation of light hydrocarbons, so that the feed hydrogen may contain impurities such as carbon monoxide, light hydrocarbons, etc. Generally, the hydrotreating or hydrogenation process itself consumes only a fraction of the hydrogen feed. So there is substantial recycling of lower purity hydrogen to be handled within the process itself.

The usual practice in purifying hydrogen containing streams above the criconden bar is to reduce the pressure substantially to facilitate the condensation and removal of impurities after which the purified hydrogen must be recompressed. Due to the practical difficulties of compressing hydrogen and the unavoidable energy loss associated with decompressing and compressing the streams before and after the cryogenic purification scheme, a purification which avoids depressurization of the stream to be purified would clearly be highly desirable.

OBJECTS OF THE INVENTION

It is an object of this invention to provide a process for converting a low purity hydrogen stream into a high purity hydrogen stream without substantial depressurization of the stream.

It is another object of this invention to provide a process in which a stream can be purified with a small cryogenic unit.

It is a further object of this invention to provide a separation process in which the investment and operating costs of dehydrating feed gas can be reduced.

It is a further object of this invention to provide a process for hydrogen recovery in which the degree of recovery is high, the purity is high and the process is simple and easily controlled.

SUMMARY OF THE INVENTION

In one aspect, there is provided a process for purifying a hydrogen containing stream without substantial depressurization of the stream. The stream is first passed through a membrane separation unit and a first portion of the hydrogen is removed from the stream. The treated stream, now hydrogren depleted, is more readily condensable and is subjected to cryogenic purification to separate the second portion of the hydrogen therefrom. The first and second portions of the hydrogen separated from the stream can be combined and recycled if desired. Substantial repressurization of the hydrogen is thus avoided.

In another aspect of the invention, there is provided an apparatus for separating the components of a gas stream. A source of hydrogen containing gas is connected by conduit means to a membrane separation unit having a first chamber and a second chamber separated by a membrane which is selectively permeable to hydrogen. A refrigeration unit is connected to the first chamber by a suitable conduit means and is capable of liquifying certain components from the conduit means. A means for conducting a phase separation between hydrogen enriched gas and the hydrogen depleted liquid is connected to the refrigeration unit by coduit means for providing phase separation of the condensed portion of the contents of the conduit means from the uncondensed portion. By combining the membrane separation unit with the refrigeration unit, the size of the refrigeration unit can be greatly reduced. By removing a first portion of the hydrogen from the feed to the cryogenic unit, dehydration is simplified and the investment and operating costs of the dehydration unit is greatly reduced. Energy consumption and overall investment of such a unit is less than for either a total cryogenic unit or total membrane unit.

BRIEF DESCRIPTION OF THE DRAWING

The FIGURE schematically illustrates certain features of one embodiment of the present invention.

DETAILED DESCRIPTION OF THE DRAWING

Figure 1:
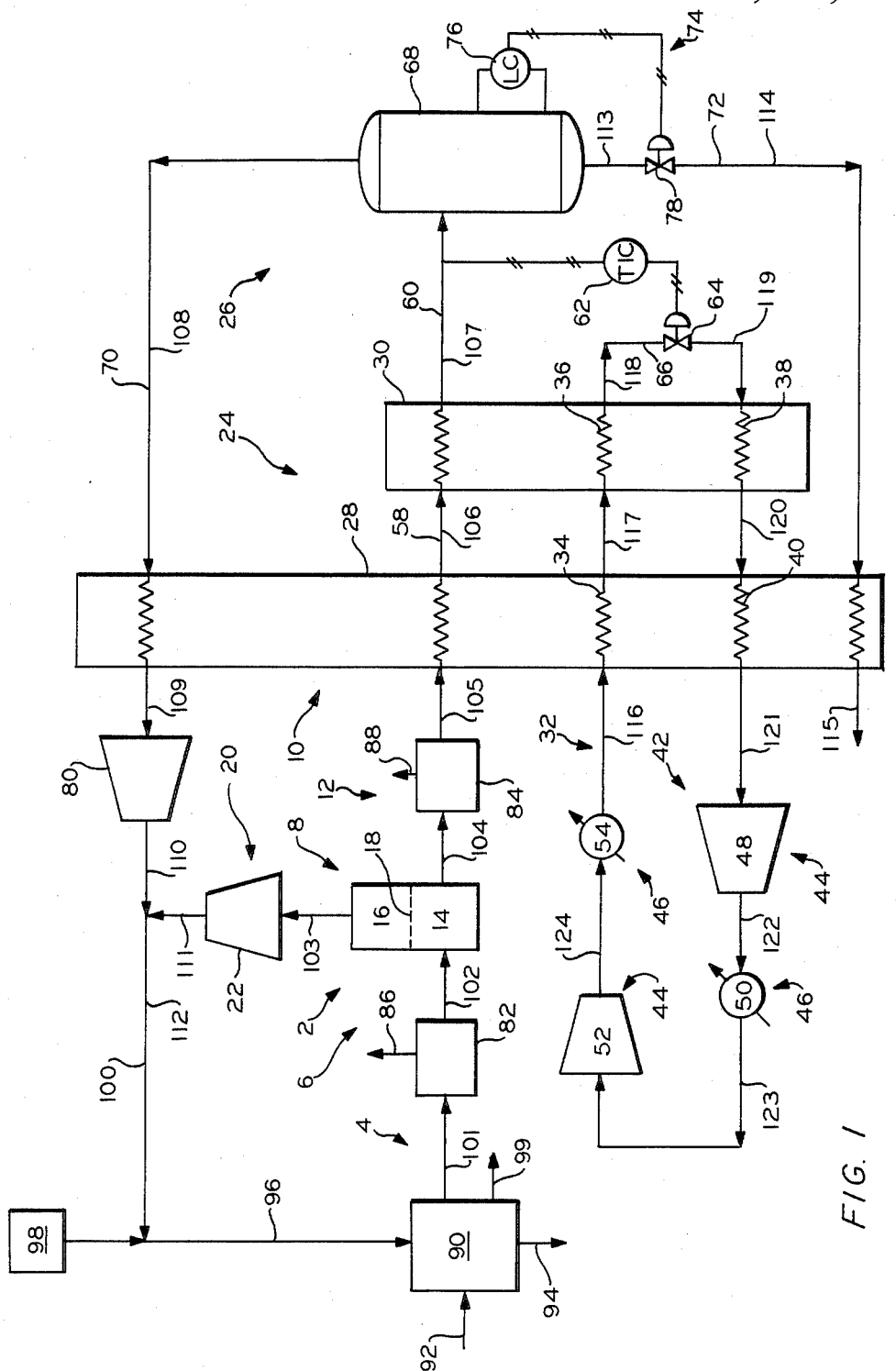

According to certain aspects of the invention, a separation system 2 is connected to a source 4 of hydrogen containing gas by conduit means 6. The source 4 may have a pressure above the criconden bar.

The separation system 2 can be formed from a membrane separation unit 8 and a cryogenic separation unit 10, the unit 8 and the unit 10 being connected by a suitable conduit means 12.

The unit 8 can be formed from a suitable housing defining a first chamber 14 and a second chamber 16. A membrane 18 separates the chamber 16 from the chamber 14. The membrane 18 provides a means for selectively removing a first portion of the hydrogen from a hydrogen containing gas stream carried by the conduit means 6. The membrane 18 can be conventional. For example, the membrane 18 can be formed by any membrane which passes hydrogen selectively over light hydrocarbons and the like. One of the most common membrane materials suitable for this purpose is formed from an asymmetric film of cellulose acetate.

The conduit means 6 empties into the chamber 14 and the conduit means 12 draws from the chamber 14. Usually, the conduit means 6 is connected to one end of the chamber 14 and the conduit means 12 to the other end. A conduit means 20 is connected to the chamber 16 so as to draw a high purity hydrogen permeate from the chamber 16. Usually, the means 20 will contain a compressor 22 for repressurization of the permeate to a pressure suitable to cause it to flow to where needed.

The cryogenic unit 10 can be formed by a cooling means 24 and a means 26 for phase separating a gas and a liquid. The cooling means 24 provides a means for condensing the condensable components carried by conduit means 12. Generally, the cooling means 24 will provide means for circulating two or more fluids in indirect heat exchange relationship. For example, heat exchangers 28 and 30 can be used to cool the contents carried by the conduit means 12 by indirect heat exchange with a refrigerant circulating in a refrigerant loop 32 which passes through the heat exchangers 28 and 30.

A suitable refrigerant, such as nitrogen, is circulated through the refrigerant loop 32. In a preferred embodiment, the loop 32 defines a refrigerant flow path making a first pass 34 through the heat exchanger 28, a first pass 36 through the heat exchanger 30, a second pass 38 through the heat exchanger 30, and a second pass 40 through the heat exchanger 28. In a portion 42 of the loop 32 between the passes 34 and 40 there is provided at least one compressor means 44 and at least one cooler means 46. Preferably, the loop portion 42 is routed through a first compressor 48, a first cooler 50, a second compressor 52 and a second cooler 54 which are connected in series between the pass 40 and pass 34.

The conduit means 12 includes a conduit 58 extending between the heat exchanger 28 and the heat exchanger 30 and a conduit 60 connecting the heat exchanger 30 with the phase separator 26 thus defining a flow path between the units 24 and 26. A temperature sensor, such as temperature indicator controller 62, can be positioned to sense the temperature of fluid flowing through the conduit 60 and establish a signal representative of the temperature. A valve 64, preferably a motor valve, is positioned in the refrigerant loop 32 to control the flow of refrigerant through the loop. In the illustration the valve 64 is positioned in a portion 66 of the refrigerant loop 32 which connects the first pass 36 with the second pass 38 through the heat exchanger 30. The controller 62 manipulates the valve 64 responsively to the temperature of the fluid carried by the conduit 60 thereby effecting control of the fluid flow through refrigerant loop 32 and thus the temperature of the contents of the conduit 60.

The conduit 60 empties into the means for conducting phase separation. A suitable means 26 can be formed from a vessel 68 of sufficient size to provide for phase separation of the condensate and gas carried by the conduit 60. A conduit means 70 is positioned to withdraw a gas stream from the vessel 68. A conduit means 72 is positioned so as to draw a liquid stream from the vessel 68. Usually, the conduit 70 will be connected to an upper portion of the vessel 68 and the conduit 72 will be connected to a lower portion of the vessel 68. Preferably, the vessel 68 is provided with means 74 for controlling the level of liquid therein. One such means 74 can be formed from a level controller 76 connected to the vessel 68 so as to sense the liquid level therein and establish a signal representative of the liquid level. The signal is sent to a valve 78 positioned in the conduit 72 so as to control the liquid flow through the conduit 72. Preferably, the valve 78 is of the motor valve type and receives the signal from the level controller and manipulates the liquid flow through the conduit responsively to the thus received signal thereby controlling the flow through conduit 72 in response to the liquid level in the vessel 68 and thus the liquid level in the vessel. In a preferred embodiment, the conduit means 70 is passed through portion of the cooler 24 so as to recover from it a portion of the cooling required by the cryogenic unit 10. Similarly, the conduit means 72 is preferably passed through a portion of the heat exchanger 28 so as to recover from it a portion of the required cooling for the operation of the cryogenic unit. Preferably, the conduits 70 and 72 pass through a portion of the heat exchanger 28. After passing through the heat exchanger 28, the contents of the conduit 72 have become heated and may be routed to further processing as required. The contents of the conduit 70 can be subjected to rather mild compression by booster compressor 80 for many processes and combined with the exhaust from the compressor 22, since both exhausts contain high purity hydrogen.

Feed to the unit 2 is preferably partially dried prior to being introduced into the unit. Thus, in a preferred embodiment, the conduit means 6 includes a drier 82 for dehydration of the feed passing to the separators. Since the cryogenic unit 10 requires feed having a lower water content than the membrane separation unit 2, the feed to it carried by the conduit means 12 is preferably subjected to further drying in a drier 84. Due to the hydrogen being separated into stages in the inventive system, the unit 82 can be an inexpensive glycol dehydration unit, for example, and the unit 84 a much smaller mole sieve drier. Water can be withdrawn from the unit 82 via a line 86 and from the unit 84 via the line 88.

As an example of a process to which the present invention would be applicable the stream source 4 illustrated in the drawing comprises a hydroretorting unit 90. Crushed oil shale is introduced into the unit 90 via a line 92. Spent oil shale is withdrawn from the unit 90 via line 94. Hydrogen is introduced into the unit 90 via line 96. The line 96 carries makeup hydrogen from a source 98 such as a reformer and recycle hydrogen from a line 100 which is connected to the exhaust of compressors 22 and 80. The hydrogen in the retort 90 at a pressure in the range of 200 to 2000 psig is reacted with the oil shale over a time period in the range of 0.1 to 10 hours at a temperature in the range of from 700° to 1100° F. After suitable cooling, a shale oil stream is withdrawn from the unit 90 via the line 99. A light gas stream is withdrawn from the unit 90 via the conduit means 6 and subjected to the hereinabove described purification steps.

The invention is illustrated by the following calculated examples.

CALCULATED EXAMPLE

Table I below shows a material balance for a system as shown in FIG. 1.

TABLE I

|  | 101 | 103 | 104 | 110 | 112 | 115 |
|---|---|---|---|---|---|---|
| $H_2$ | 50,836 | 26,535 | 24,301 | 24,214 | 50,749 | 87 |
| CO | 986 | 111 | 875 | 633 | 744 | 242 |
| Cl | 3,361 | 302 | 3,059 | 426 | 728 | 2,633 |
| $C_2^=$ | 12 | 1 | 11 | — | 1 | 11 |
| $C_2$ | 998 | 54 | 944 | — | 54 | 944 |
| $C_3^=$ | 201 | 7 | 194 | — | 7 | 194 |
| $C_3$ | 587 | 21 | 566 | — | 21 | 566 |
| $C_4^=$ | 156 | 4 | 152 | — | 4 | 152 |
| $C_4$ | 330 | 9 | 321 | — | 9 | 321 |
| $C_5$ | 16 | 1 | 15 | — | 1 | 15 |
| $H_2O$ | 60 | 19 | 6 |  | 19 | — |
| Totals | 57,543 | 27,064 | 30,444 | 25,273 | 52,337 | 5,165 |

Table II shows the temperatures and pressures of the noted streams.

TABLE II

|  | T, °F. | PSIA |
|---|---|---|
| 101 | 100 | 1003 |
| 102[1] | 100 | 1000 |
| 103 | 100 | 750 |
| 104 | 100 | 975 |
| 105[2] | 100 | 972 |
| 106 | −240 | 969 |
| 107 | −270 | 966 |
| 108 | −270 | 966 |
| 109 | 88 | 963 |
| 110 | 115 | 1100 |

TABLE II-continued

| | T, °F. | PSIA |
|---|---|---|
| 111 | 182 | 1100 |
| 112 | 150 | 1100 |
| 113 | −270 | 966 |
| 114 | −265 | 105 |
| 115 | 88 | 100 |
| 116 | 100 | 506 |
| 117 | −240 | 503 |
| 118 | −270 | 500 |
| 119 | −280 | 112 |
| 120 | −270 | 109 |
| 121[3] | 88 | 106 |
| 122 | 263 | 235 |
| 123 | 100 | 230 |
| 124 | 279 | 510 |

[1] 70° F. dewpoint
[2] 1 ppm $H_2O$
[3] 8048 mols/hr. of $N_2$

What is claimed is:

1. A process for separating a gas stream containing a high concentration of hydrogen gas from a high-pressure first gas stream containing a low concentration of hydrogen gas, said process comprising:
   (a) introducing the high-pressure first gas stream into a separation zone containing a membrane which is selectively permeable to hydrogen and divides said separation zone into a high-pressure first chamber and a low pressure second chamber, wherein the first gas stream is introduced into the first chamber;
   (b) withdrawing low-pressure high purity hydrogen gas permeate from the second chamber;
   (c) withdrawing a second gas stream from the first chamber which has a lower concentration of hydrogen gas than the first gas stream, and is at a lower pressure than the first gas stream;
   (d) cooling the second gas stream sufficiently to condense substantially all condensable components in the second gas stream and provide a high purity hydrogen third gas stream.

2. A process as in claim 1 further comprising phase separating the condensable components to provide the high purity hydrogen gas third stream.

3. A process as in claim 2 further comprising drying the first gas stream.

4. A process as in claim 3 further comprising drying the second gas stream.

5. A process as in claim 2 further comprising passing the high purity hydrogen third gas stream in indirect heat exchange relationship with the second gas stream.

6. A process as in claim 2 further comprising circulating a refrigerant stream in indirect heat exchange relationship with the second gas stream.

7. A process as in claim 2 wherein the first gas stream is at a pressure above the cricondenbar; said process further comprising compressing the high purity hydrogen gas permeate; compressing the high purity hydrogen gas third stream; and combining the thus compressed permeate and high purity hydrogen gas second stream.

8. Apparatus comprising:
   (a) a source of hydrogen containing gas;
   (b) a separator having a first chamber and a second chamber separated by a membrane which is selectively permeable to hydrogen;
   (c) a conduit means connecting the source of hydrogen containing gas with the first chamber of the separator;
   (d) a conduit means connected to the second chamber for withdrawing hydrogen therefrom;
   (e) a cooler;
   (f) a source of coolant connected to the cooler;
   (g) a conduit means connected to the first chamber for withdrawing hydrogen depleted gas from the first chamber and conveying said hydrogen depleted gas through the cooler;
   (h) a means for phase separating a hydrogen rich gas from a hydrogen depleted liquid;
   (i) a conduit means connecting the cooler with the means for phase separating for conveying the hydrogen depleted liquid from the cooler to the means for phase separating.

9. Apparatus as in claim 8 wherein the means for carrying out the phase separation comprises a vessel, a conduit means connected to an upper portion of the vessel for withdrawing the hydrogen enriched gas and a conduit means connected to the lower portion of the vessel for withdrawing the hydrogen depleted liquid.

10. Apparatus as in claim 9 wherein the conduit means for withdrawing the hydrogen enriched gas from the means for phase separating passes through the cooler; and wherein the conduit means for withdrawing the hydrogen depleted liquid from the means for phase separating passes through said cooler.

11. Apparatus as in claim 10 further comprising a first dryer, wherein the first dryer provides the source of hydrogen containing gas; and a second dryer, wherein the second dryer is positioned in the conduit means connecting the first chamber with the cooler.

12. Apparatus as in claim 10 further comprising a compressor connected to the second chamber by the second conduit means and a second compressor connected to the cooler by the conduit means from the upper portion of the vessel, and oil shale retort for retorting oil shale in the presence of added hydrogen; and conduit means connecting the first compressor and the second compressor with the oil shale retort.

* * * * *

REEXAMINATION CERTIFICATE (1282nd)
United States Patent [19]
DeLong et al.

[11] B1 4,732,583
[45] Certificate Issued  May 15, 1990

[54] GAS SEPARATION

[75] Inventors: Bradley W. DeLong, Bartlesville, Okla.; Jeffrey R. Burkinshaw, Casper, Wyo.

[73] Assignee: Phillips Petroleum Co., Bartlesville, Okla.

Reexamination Request:
No. 90/001,816, Aug. 1, 1989

Reexamination Certificate for:
Patent No.: 4,732,583
Issued: Mar. 22, 1988
Appl. No.: 677,668
Filed: Dec. 3, 1984

[51] Int. Cl.$^5$ .......................................... B01D 53/24

[52] U.S. Cl. .......................................... 55/16; 55/68; 55/158; 55/267; 62/24
[58] Field of Search .................. 55/16, 68, 158; 62/23, 62/24

[56] References Cited
U.S. PATENT DOCUMENTS
3,251,652  5/1966  Pfefferle ................................. 55/16
4,548,618  10/1985  Linde et al. ........................... 55/16

Primary Examiner—Robert H. Spitzer

[57] ABSTRACT

By incorporating a gas permeable membrane into a hydrogen purification process at the front end of the cryogenic unit, the low purity hydrogen can be made into a high purity stream and a low purity stream. The critical pressure of the low purity stream is such that the low purity stream can be purified cryogenically without depressurization.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are cancelled.

Claims 3–10 and 12 are determined to be patentable as amended.

Claim 11, dependent on an amended claim, is determined to be patentable.

New claim 13 is added and determined to be patentable.

3. A process as in claim [2] *13* further comprising drying the first gas stream.

4. A process as in claim [3] *13* further comprising drying the second gas stream.

5. A process as in claim [2] *13* further comprising passing the high-purity hydrogen third gas stream in indirect heat exchange relationship with the second gas stream.

6. A process as in claim [2] *13* further comprising circulating a refrigerant stream in indirect heat exchange relationship with the second gas stream.

7. A process as in claim [2 wherein the first gas stream is at a pressure above the criconden bar; said process] *13* further comprising compressing the high purity hydrogen gas permeate; compressing the high purity hydrogen gas third stream; and combining the thus compressed permeate and high purity gas [second] *third* stream.

8. Apparatus comprising:
 (a) a source of hydrogen containing gas;
 (b) a separator having a first chamber and a second chamber separated by a membrane which is selectively permeable to hydrogen;
 (c) a conduit means connecting the source of hydrogen containing gas with the first chamber of the separator;
 (d) a conduit means connected to the second chamber for withdrawing hydrogen therefrom;
 (e) a cooler;
 (f) a source of coolant connected to the cooler;
 (g) a conduit means connected to the first chamber for withdrawing hydrogen depleted gas from the first chamber and conveying said hydrogen depleted gas through the cooler;
 (h) a means for phase separating a hydrogen rich gas from a hydrogen depleted liquid;
 (i) a conduit means connecting the cooler with the means for phase separating for conveying the *thus cooled* hydrogen depleted liquid from the cooler to the means for phase separating [.];
 (j) *means for withdrawing hydrogen rich gas from the cooler;*
 (k) *an oil shale retort for retorting oil shale in the presence of added hydrogen; and*
 (l) *means connecting the second chamber and the means for withdrawing hydrogen rich gas from the cooler with the oil shale retort.*

9. Apparatus as in claim 8 wherein the means for carrying out the phase separation comprises a vessel, *said means for withdrawing hydrogen rich gas in the form of* a conduit means connected to an upper portion of the vessel [for withdrawing the hydrogen enriched gas] and a conduit means connected to the lower portion of the vessel for withdrawing the hydrogen depleted liquid.

10. Apparatus as in claim 9 wherein the conduit means for withdrawing the hydrogen [enriched] *rich* gas from the means for phase separating passes through the cooler; and wherein the conduit means for withdrawing the hydrogen depleted liquid from the means for phase separating passes through said cooler.

12. Apparatus as in claim 10 further comprising a compressor connected to the second chamber by the [second] conduit means *for withdrawing hydrogen* and a second compressor connected to the cooler by the conduit means from the upper portion of the vessel [, and oil shale retort for retorting oil shale in the presence of added hydrogen; and conduit means connecting the first compressor and the second compressor with the oil shale retort].

13. *A process for retorting crushed oil shale in the presence of added hydrogen which comprises:*
 (a) *reacting crushed oil shale with hydrogen in an oil shale retort under hydroretorting conditions of 200 to 2000 psig over a time period of 0.1 to 10 hours at a temperature in the range of 700° to 1100° F.;*
 (b) *withdrawing a hydrogen-containing high-pressure first gas stream from the oil shale retort;*
 (c) *introducing the high-pressure first gas stream into a separation zone containing a membrane which is selectively permeable to hydrogen, and which divides the separation zone into a high-pressure first chamber and a low-pressure second chamber, wherein the first gas stream is introduced into the first chamber;*
 (d) *withdrawing low-pressure high purity hydrogen gas permeate from the second chamber;*
 (e) *withdrawing a gas stream from the first chamber as a second gas stream, wherein the second gas stream has a lower concentration of hydrogen gas then the first gas stream, and is at a lower pressure than the first gas stream;*
 (f) *cooling the second gas stream sufficiently to condense substantially all condensable components in the second gas stream so as to provide a partially condensed second gas stream; and*
 (g) *separating the partially condensed second gas stream in a phase separator and withdrawing from the phase separator a high-purity hydrogen gas third stream.*

* * * * *